United States Patent [19]
Wilson

[11] Patent Number: 5,540,797
[45] Date of Patent: Jul. 30, 1996

[54] PULTRUSION APPARATUS AND PROCESS

[76] Inventor: Maywood L. Wilson, 403 Calthrop Neck Rd., Yorktown, Va. 23693

[21] Appl. No.: 409,976

[22] Filed: Mar. 24, 1995

[51] Int. Cl.⁶ .................................................. B29C 70/52
[52] U.S. Cl. ........................ 156/180; 156/166; 156/441; 264/136; 264/137; 264/171.13; 264/145; 425/114; 425/296
[58] Field of Search .................................. 156/166, 180, 156/181, 441; 264/135, 136, 137, 258, 171.13, 145, 148, 151; 425/113, 114, 296

[56] References Cited

U.S. PATENT DOCUMENTS

| | | |
|---|---|---|
| 3,993,727 | 11/1976 | Moyer . |
| 4,238,266 | 12/1980 | Steinberg . |
| 4,439,387 | 11/1984 | Hawley . |
| 4,778,376 | 10/1988 | Hilakos . |
| 4,864,964 | 9/1989 | Hilakos . |
| 4,900,499 | 2/1990 | Mills . |
| 4,957,422 | 9/1990 | Glemet . |
| 5,084,221 | 1/1992 | Matsuno et al. ............. 156/180 |
| 5,192,383 | 3/1993 | Cavin ........................... 156/180 |
| 5,198,172 | 3/1993 | Spoo et al. ................... 156/180 |
| 5,205,898 | 4/1993 | Wilson . |
| 5,225,020 | 7/1993 | Millett et al. ................ 156/180 |
| 5,277,566 | 1/1994 | Augustin et al. ............ 264/136 |
| 5,324,377 | 6/1994 | Davies .......................... 156/166 |

*Primary Examiner*—Mathieu D. Vargot
*Attorney, Agent, or Firm*—Wallace J. Nelson

[57] ABSTRACT

A pultrusion apparatus and process for impregnation of multiple fiber tows with a thermoplastic resin wherein an impregnation vessel having an entrance and an exit end is provided with a fiber control insert formed of spaced cylindrical rings suspended therein, with a resin flow control device being suspended horizontally within the rings. A combined resin meter and profile die is attached to the impregnation vessel exit end with a cooling die connected thereto. A pulling mechanism pulls the fiber tows through melted resin contained within the impregnation vessel and into a stepped decreasing diameter passageway in the resin meter and profile die to remove excess resin and shape the impregnated fiber into a useful structure before it is cooled below the melting point of the resin by the cooling die. In one embodiment, a cut-off station is provided adjacent the pulling mechanism to cut the cooled impregnated fiber structure into the desired lengths. In another embodiment, the pulling mechanism includes a winding spool with separate compartments therein to accommodate up to five separate impregnated fiber structures received from a five passageway resin metering and profile die.

25 Claims, 6 Drawing Sheets

PULTRUSION APPARATUS AND PROCESS

FIELD OF THE INVENTION

This invention relates generally to the manufacture of fiber reinforced thermoplastic structures and relates specifically to an improved pultrusion apparatus and process for making resin impregnated fibers in the form of rods, bars, tubes, pipes, and other structural shapes.

BACKGROUND OF THE INVENTION

Pultrusion is the term used to describe continuous pulling of fiber tows or rovings through a resin for impregnation, through a heated die for polymerization, and to a cut-off station for cutting the pultruded structure to desired lengths. Pultrusion processes, using reinforcements of fiberglass, graphite, and aramid fibers, and thermosetting resins, are well known, and are commonly referred to as "conventional pultrusion", while pultrusion processes using thermoplastic resins are very rare.

One disadvantage of thermosetting resin pultrusion acquired structures is the inability to reform or reshape a structure after it has passed through the process, due to the inability to reverse the cross-linking of the resin molecules in the process.

Another disadvantage of thermosetting resin use in pultrusion is the necessity of noxious and hazardous chemicals and solvents employed in the process ingredients. These materials include monomers and reactants such as styrene and methylenedianiline, and others.

The solvents used in some processes for thermoplastic pultrusion such as methylene chloride, chloroform, dimethyl formamide, and normal methyl pyrrolidone, employed in dissolving thermoplastic polymers prior to impregnating fibers in slurries and solutions, also present problems.

Another disadvantage of presently used thermoplastic pultrusion methodology is the inability to achieve an optimum fiber to resin volume ratio, and thereby maximize mechanical strength, specifically compression, flexural, and tensile strengths in the pultruded structure.

Other disadvantages of thermoplastic pultrusion products and processes is the inability to thoroughly wet-out fibers, thereby causing voids in resin starved areas; the cost of using prefabricated tow preg or prepreg tapes; and the limit to available lengths of these materials since they are generally manufactured by venders outside of the pultrusion industry and not available in lengths customarily employed by the pultrusion industry.

It is an object of the present invention to provide an improved apparatus and process of producing continuous fiber reinforced thermoplastic structural profiles or shapes that eliminate or minimize the disadvantages of the prior art thermosetting and thermoplastic pultrusion processes.

Another object of the present invention is to provide thermoplastic structural profiles or shapes that are essentially void free, and can be reshaped or post fabricated into additional shapes and structures by applying heat and pressure.

An additional object of the present invention is to provide an improved pultrusion apparatus and process that can employ, either recycled thermoplastic, such as polyethylene terephthalate from recycled plastic soft drink bottles, or unused or virgin resins.

A further object of the present invention is to provide an environmental friendly, improved hot-melt pultrusion apparatus and process that operates without solvents or hazardous chemicals and generates no noxious fumes.

Another object of the present invention is to provide an improved, cost effective pultrusion apparatus and process for producing continuous long length fiber reinforced thermoplastic structures that may be cut to the desired lengths or stored on or transported on spools.

Another object of the present invention is the production of fiber reinforced thermoplastic structures that may be fabricated into tension cables for bridges, retaining walls, and reinforcement bars in concrete and suitable for use in corrosive environments and earthquake sensitive areas.

An additional object of the present invention is an improved heated resin impregnation vessel for impregnating multiple tows of fiber in a hot-melt thermoplastic pultrusion process that insures through resin wetting and impregnation while maintaining a uniform resin flow and eliminating overheating and charring of the resin.

A still further object of the present invention is an improved resin melting and delivery vessel as a component part of a pultrusion apparatus.

SUMMARY OF THE INVENTION

According to the present invention, the foregoing and additional objects are attained by providing a pultrusion machine having multiple spools of fiber tow disposed adjacent one end thereof, a fiber guide and heating vessel located between the spools of fiber tow and attached to an impregnation vessel and serving to guide, and maintain separate, the individual fiber tows leading from the spools to the impregnation vessel. Heat is supplied to the fiber guide and heating vessel to preheat the fiber tows by radiation from the heated impregnation vessel. The impregnation vessel has a fiber entrance end which maintains the separate individual fiber tows in a circular pattern leading into the impregnation vessel. The impregnation vessel is provided with a fiber control insert, consisting of a series of cylindrical rings, having flat surfaces with grooved areas, attached to the fiber entrance end. The fiber control insert in the impregnation vessel is suspended horizontally toward the exit end thereof by a series of rods that maintain a prescribed spacing between the rings and serve as guides to keep individual fiber tows on a directed course through the process.

A resin flow control device, suspended horizontally through the center of the fiber control device, directs the resin flow toward the fiber tows and exit end of the impregnation vessel. A heated resin meter and profile die is attached to the impregnation vessel to control the amount of impregnating resin contained within the exiting fiber tows and to shape the final profile of the pultruded structure. A cooling die, attached to the exit end of the resin meter and profile die, lowers the temperature of the exiting structure to below the melting point of the matrix resin. The pultruded structure, emerging from the cooling die, is pulled by a pulling mechanism through a cut-off station and cut to the desired lengths, or wound on a detachable pulling spool.

BRIEF DESCRIPTION OF THE DRAWINGS

A more complete appreciation of the invention and many of the attendant advantages thereof will be more readily apparent as the same becomes better understood with reference to the following detailed description when considered in connection with the accompanying drawings wherein.

DETAILED DESCRIPTION

Figure 1:
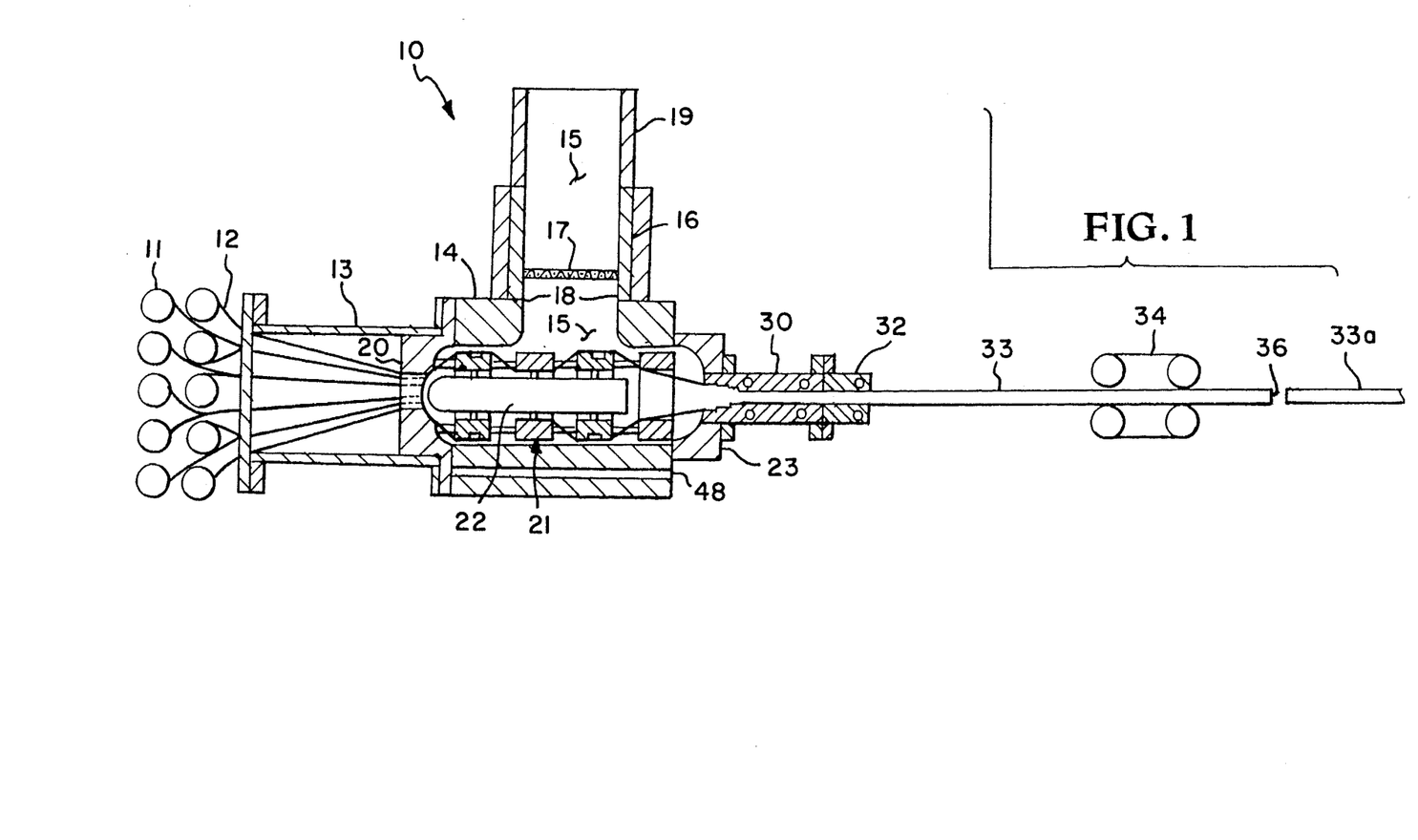
FIG. 1 is a part sectional, part schematic side view, (with parts omitted) of a pultrusion machine according to the present invention.

Referring now to the drawings and more particularly to FIG. 1, the improved pultrusion machine of the present invention is shown and designated generally by reference numeral 10. Pultrusion machine 10 is employed to make continuous lengths of useful structural materials from suitable continuous fiber tows or rovings and heat processible thermoplastic polymers or resins. Multiple spools 11 of suitable fiber tows 12 are provided with the ends of the individual fiber tows 12, leading from spools 11, being threaded through a fiber tow guide and heating vessel 13 into an impregnation vessel 14 attached thereto. Impregnation vessel 14 is filled with molten impregnation material 15 received from a resin melting vessel 16 through a filter 17 at entrance port 18. Unmelted resin enters melting vessel 16 through feed tube 19, as will be explained further hereinafter.

Impregnation vessel 14 is provided with a fiber entrance end 20 that maintains separation of fiber tows 12 passing therethrough. A fiber control insert 21 is attached to fiber entrance end 20 and a resin flow control insert 22 suspended horizontally within or inside of fiber control insert 21. A fiber exit end 23 is provided in impregnation vessel 14, the structure of which will be further explained hereinafter.

A resin meter and profile die 30 is attached to exit end 23 of impregnation vessel 14 and a cooling die 32 is attached at the exit end of resin meter and profile die 30, the structure of which will also be further explained hereinafter.

Fiber tows 12, maintained separated, are impregnated with molten resin 15 while passing through impregnation vessel 14, and one or a plurality of fiber tows 12 impregnated with resin 15 are directed into a single or plurality of passageways provided by resin meter and profile die 30 and cooling die 32, as will be explained further hereinafter. Fiber tows 12, impregnated with resin 15, are consolidated and cooled below the melting temperature of resin 15 to form fiber reinforced thermoplastic structure 33. The fiber reinforced structure 33 is continuously pulled by pulling mechanism 34 through cut-off station 36 and cut to the desired lengths 33a. Pulling mechanism 34 comprises a pair of spaced motor driven belts (not designated) for frictionally contacting and pulling fiber reinforced structure therethrough.

In lieu of pulling mechanism 34, fiber reinforced thermoplastic structure 33 may be pulled and coiled on a spool by a pulling and winding device, as will be further explained hereinafter.

Figure 2:
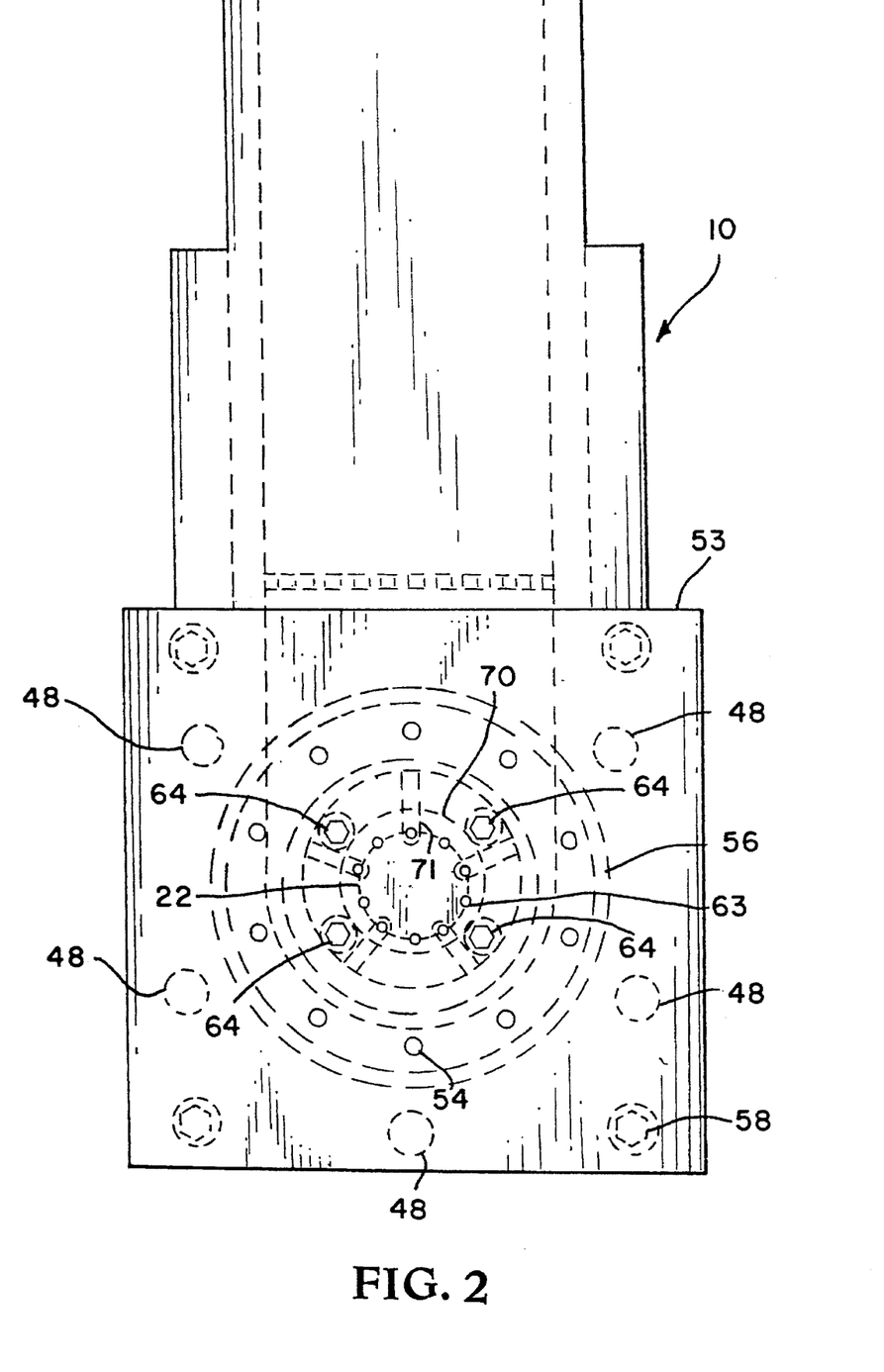
FIG. 2 is an end view of the pultrusion machine of FIG. 1 illustrating the fiber tow entrance end of the fiber tow guide and preheating vessel.
Figure 3:
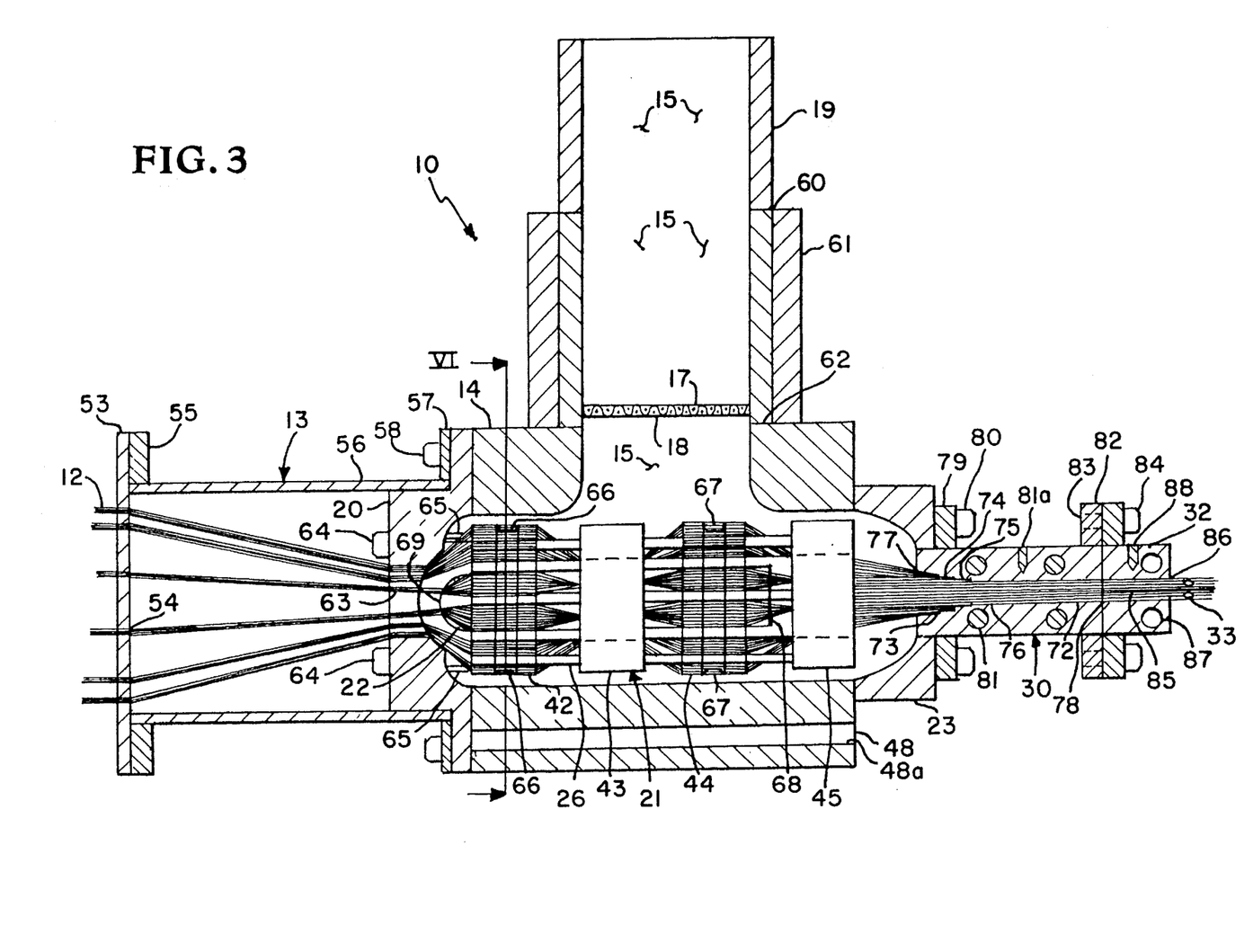
FIG. 3 is a part sectional, part schematic enlarged side view of the pultrusion machine of FIG. 1 showing details of the fiber tow guide and preheating vessel, and other structure of the present invention.

Referring now more particularly to FIGS. 2 and 3, fiber tow guide and heating vessel 13 is provided with an entrance end plate 53 having a plurality of separated tow passageways or openings 54 therethrough, arranged in a circular pattern, for threadingly receiving separate fiber tows 12 from spools 11. A circular threading pattern is employed in order to introduce fiber tows 12 into impregnation vessel 14 through entrance end 20 ready for distribution evenly around fiber control insert 21. Entrance end plate 53 is attached to entrance end bracket 55, and is detachable and replaceable to accommodate any number of tows or rovings and diverse filament counts or yields. Entrance end bracket 55 is also detachable from the fiber heating section 56 of fiber tow guide and heating vessel 13.

Fiber heating section 56 of fiber tow guide and heating vessel 13 is cylindrical in configuration, as illustrated in FIGS. 2 and 3. Fiber tow guide and heating vessel 13 is provided with attachment flange 57 and secured to impregnation vessel 14 by screws or bolts 58 extending through flange 57. The screws or bolts 58 are threaded into fiber entrance end 20 of impregnation vessel 14. Fiber entrance end 20 of impregnation vessel 14 extends inside fiber guide and heating vessel 13 a short distance (0.75 inch in a specific embodiment) to thereby supply heat, by radiation, inside fiber guide and heating vessel 13 for preheating fiber tows 12 prior to entering impregnation vessel 14 through fiber entrance end 20.

In the preferred embodiment of the present invention, entrance plate 53, fiber preheating section 56, and flange 57 of fiber tow guide and heating vessel 13 were fabricated from type 347 stainless steel and polished to a surface finish of four micro-inches root mean square (RMS). Entrance end bracket 55 was fabricated from type 6061-T3 aluminum alloy.

Impregnation vessel 14 is provided with a cylindrical interior, filled with molten resin 15 which enters through entrance port 18, and provided with detachable fiber entrance end 20, fiber control insert 21, resin flow control insert 22, and detachable exit end 23. A resin meter and profile die 30 is attached to the exterior of exit end 23.

Figure 7:
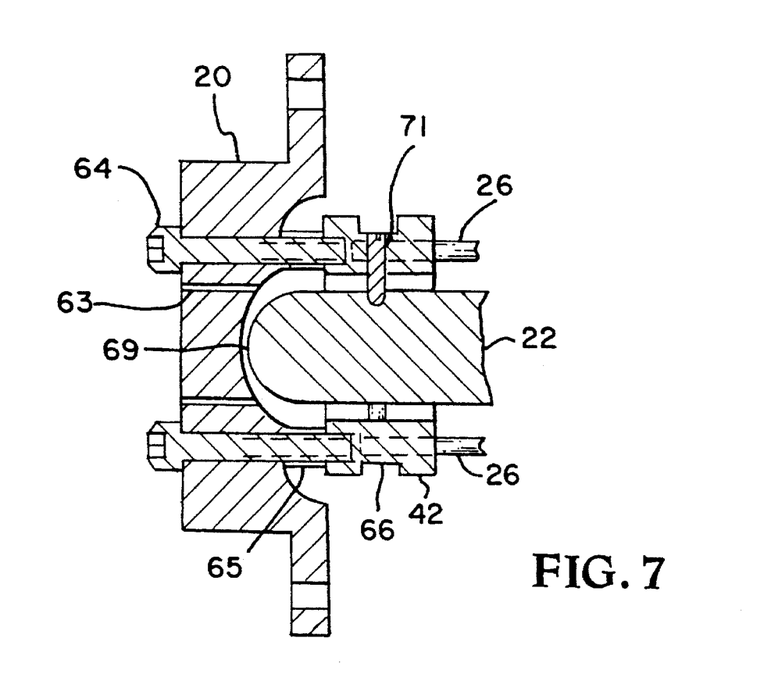
FIG. 7 is a part schematic, part sectional view of the pultrusion machine of the present invention with parts oriented to show details of the fiber entrance end, fiber guide attachment bolts and spacers, fiber guide ring, fiber guide ring attachment rods, and resin control insert.

Fiber tows 12 are separated and directed into impregnation vessel 14 through individual passageways 63 (FIGS. 2, 3, and 7) which are equally spaced in a circular pattern, having center axis in line with center axis of impregnation vessel 14. The inside end of passageways 63 intersect the hemispherical or concave interior surface of fiber entrance end 20. As illustrated in FIGS. 2, 3 and 7, fiber control insert 21 is attached to the interior surface of fiber entrance end 20, secured by four screws or bolts 64 and spacers 65, and suspended horizontally and longitudinally in the center of impregnation vessel 14. Fiber control insert 21 is provided with four fiber guide rings, designated 42, 43, 44, and 45, and secured to each other by eight horizontally inserted fiber guide rods 26 which are employed to maintain adjustable spacing between fiber guide rings 42,43,44,45 and to guide and maintain separated equal spacing between individual fiber tows 12 throughout the impregnation process. Fiber guide rings 42, 43, 44 and 45 are cylindrical rings, having rectangular cross-sections, and each have an outside or periphery and an inside opening or passageway.

All sharp edges on fiber guide rings 42, 43, 44, and 45 are removed and edges are provided with 0.062 inch radiuses and polished to a surface finish of four micro-inches RMS. Fiber guide rings 42 and 44 have circumferential grooved areas 66 and 67, respectively, in their outside surfaces to provide passageways for resin to flow under fiber tows 12.

Fiber tows 12 are directed to pass over the outside or periphery of fiber guide ring 42 and forced to open and spread, which increases tension on, and removes twists in, fiber tows 12. While fiber tows 12 are passing over the outside or periphery of fiber guide ring 42, grooved area 66 in the periphery of fiber guide ring 42 provides for melted resin 15 flow to the underside of the opened and spread fiber tows 12, infiltrating and impregnating fiber tows 12, and flowing around filaments within spread fiber tows 12 while simultaneously, resin 15 is infiltrating and impregnating from the outside of spread fiber tows 12.

Fiber tows 12, spread opened and impregnated with molten resin 15, are directed between guide rods 26 to the inside perimeter of fiber guide ring 43 and forced to close. This increases tension on fiber tows 12, causing filaments and absorbed molten resin 15 to consolidate, squeezing out excess resin 15 and forcing filaments within fiber tows 12 to thoroughly wet-out. Further, fiber tows 12 are directed to pass over the outside periphery of fiber guide ring 44 and forced to again open and spread a second time, which further increases tension on fiber tows 12, and removes any remaining twists in fiber tows 12.

While fiber tows 12 are passing over the outside periphery of fiber guide ring 44, grooved area 67 in the periphery of fiber guide ring 44 provides for resin 15 to flow into the underside of opened and spread fiber tows 12, infiltrating and impregnating fiber tows 12, and flowing around filaments within spread fiber tows 12 while, simultaneously, resin 15 is infiltrating and impregnating from the outside of spread fiber tows 12. Fiber tows 12, spread open and saturated with impregnating resin 15, are directed to the inside perimeter of fiber guide ring 45 and forced to close a second time, which increases tension on fiber tows 12, causing consolidation of filaments and absorbed resin 15, squeezing out excess resin 15 and forcing filaments within fiber tows 12 to thoroughly wet-out, thereby perfecting fiber wetting and impregnation in fiber tows 12.

Figure 6:
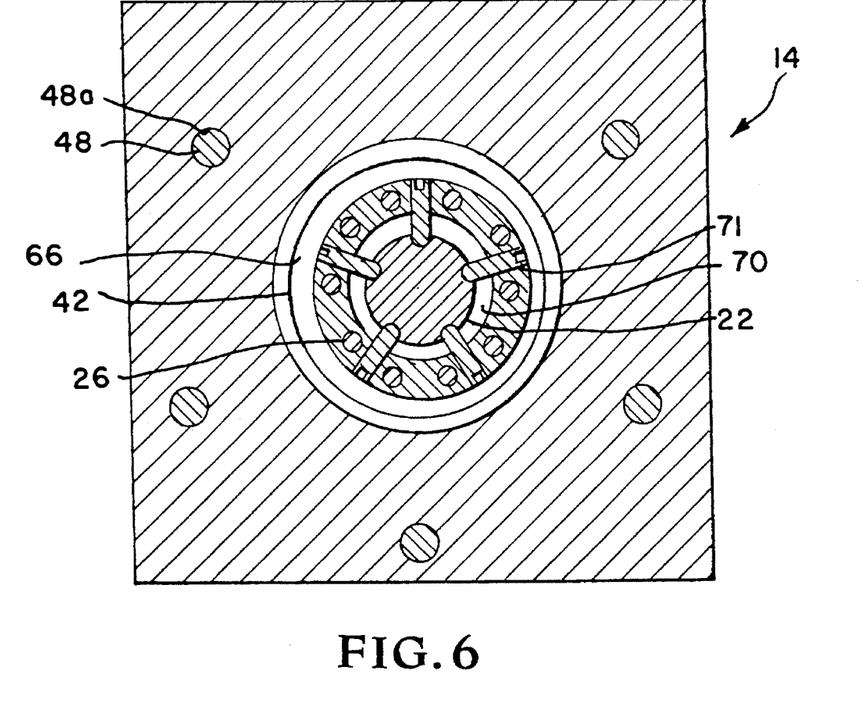
FIG. 6 is a sectional, part schematic, view taken along line VI—VI of FIG. 3.

Resin flow control insert 22 is an elongated round bar, having a flat end 68, with sharp edges removed, and a second end 69 hemispherical in shape, suspended and secured horizontally through the center of fiber control rings 42 and 44 by five retaining and centering bolts 71. These five bolts 71 extend through suitable recessed threaded holes in each of fiber control rings 42 and 44 to engage respective holes in resin flow control insert 22 for positioning thereof, as illustrated in FIGS. 2, 6 and 7. Resin flow control insert 22 controls the volume and flow of melted resin 15 in impregnation vessel 14 by eliminating space where resin 15 is not required and forcing resin 15 to flow in the path or course of fiber tows 12 as the fiber tows move through impregnation vessel 14. A space 70, maintained between resin flow control insert 22 and the inside perimeter of fiber control insert 21 (FIGS. 2, 6 and 7), forces resin 15 to flow between and around fiber tows 12 and fiber control rings 42, 43, 44, and 45.

The hemispherical end 69 of resin flow control insert 22 extends into the concave interior side of fiber entrance end 20, forcing resin 15 to flow between fiber tows 12 as the fiber tows begin to spread open while moving toward the periphery or outside of fiber control ring 42.

The flat end 68 of resin flow control insert 22, combined with the flat outboard side of fiber control ring 45 and the downward pressure exerted on impregnation vessel 14 by the weight of resin 15 in resin entrance port 18 and resin melting vessel 16, repel the backflow of resin 15 at exit end 23 caused by resin 15 being forced or squeezed out of fiber tows 12 while passing through the resin meter section of resin meter and profile die 30. This results in fiber tows 12 retaining the quantity of resin 15 to which combined resin meter and profile die 30 is designed to accept, which will be further explained hereinafter.

Impregnation vessel 14 is heated by a plurality of electrical cartridge heaters 48 inserted in passageways 48a machined horizontally in exterior wall of sides and bottom of impregnation vessel 14, as shown in FIGS. 2, 3 and 6.

Impregnation vessel 14, fiber and resin exit end 23 and fiber entrance end 20 are preferably fabricated from type 347 stainless steel stock and their inside surfaces, including inside surfaces of fiber entrance passageways, are polished to a surface finish of four micro-inches RMS. Fiber control insert 21 and resin control insert 22 are preferably fabricated from type 17-4 precipitation hardened (PH) stainless steel, heat treated to Rockwell C-45, and polished to a surface finish of four micro-inches RMS.

Referring now more particularly to FIG. 3, the feed tube 19 and resin melting vessel 16 will be further described. Feed tube 19 and resin melting vessel 16 are cylindrical tubes, attached to the top side of impregnation vessel 14, and detachable from each other at joint 60. Resin melting vessel 16 is detachable from impregnation vessel 14 at joint 62. Resin melting vessel 16 is heated by band heater 61. Solid unmelted thermoplastic polymer or resin 15, or a combination of two or more mixed resins (blend), in physical forms such as pellets, powder, chips, chunks or shreds, is transferred to feed tube 19. The solid resin flows under the influence of gravity into resin melt vessel 16 and is heated to slightly above its melting temperature while passing through resin melting vessel 16.

The weight of the melted resin 15 causes the melted resin 15 to flow through filter screen 17 into impregnation vessel 14. Resin feed tube 19 and resin melting vessel 16 can be of any reasonable height and diameter, and a continuous resin replenishing device can, obviously, be attached to resin feed tube 19 if needed, or so desired. A filter screen 17 is attached to the exit end, or bottom 18, of resin melting vessel 16, which filters, or removes, unmelted debris and allows only melted resin 15 to pass through and flow into impregnation vessel 14.

Filter screen 17 is fabricated from type 347 stainless steel, perforated with holes, 0.093 inch in diameter, and polished to a surface finish of four micro-inches RMS. Feed tube 19 and resin melting vessel 16 are fabricated from type 347 stainless steel and their inside surfaces are polished to a surface finish of four micro-inches RMS, which essentially eliminates friction between metal surfaces and melted resin 15 as the resin flows through resin melting vessel 16 and filter 17, into entrance port 18 in impregnation vessel 14.

As discussed hereinbefore, resin meter and profile die 30 is provided with one or a plurality of through passageways 72 having varied size cross-sections, 73, 74, 75 and 76, disposed in reducing size relationship at strategic locations, to meter off excess resin and consolidate fiber tows 12 and the impregnated resin 15. Resin meter and profile die 30 is provided with an entrance end 77, exit end 78, attachment flange 79, attachment bolts 80, heat shield flange 82 with threaded bolt holes 83 receiving bolts 84 for attachment of cooling die 32 via cooling die flange 82a. A plurality of cartridge heaters 81 are disposed in suitable holes (not designated) machined in combined resin meter and profile die 30, and a heat control thermocouple probe 81a is disposed in a single hole machined in the side thereof.

Cooling die 32 is provided with a through passageway 85, having a constant cross-section identical in size and shape to passageway 76 in resin meter and profile die 30, an entrance end adjacent and aligned with exit end 78 of resin meter and profile die 30, and an exit end 86. Passageways 87 in cooling die 32 are provided for chilled water circulation for cooling the resin in pultruded thermoplastic structure 33, and a temperature control thermocouple probe 88 is provided in a suitable machined hole therein. Resin meter and profile die 30 is secured to impregnation vessel 14 by bolts 80 threaded into exit end 23 of impregnation vessel 14 through flange 79. Resin meter and profile die 30 in the specific embodiment illustrated in FIG. 3 is for the fabrication of impregnated solid rod reinforcement structures but is detachable and interchangeable with other resin meter and profile dies designed to produce other sizes and shapes, such as square, rectangular, angular, channel, pipe, tube, I-beam, and the like.

In operation of a specific embodiment, fiber tows 12, either one or a plurality, impregnated with resin 15 are pulled into entrance end 77 of resin meter and profile die 30. While passing through cross-section 73 of passageway 72, a volume of resin 15 is metered off, or debulked, to 1.7 times the volume of resin 15 required in pultruded fiber reinforced structure 33, and resin 15 and fiber tows 12 are compacted. While passing through cross-section area 74, resin 15 is further metered off, leaving 1.5 times the volume of resin 15 required in pultruded fiber reinforced thermoplastic structure 33, and further compacted. When passing through cross-section area 75 resin 15 is further metered off to 1.4 times the volume of resin required in pultruded fiber reinforced thermoplastic structure 33 and further compacted, and when passing through profile and shaping section 76, resin 15 is metered off to the final volume of resin required in structure 33. Fiber tows 12 and resin 15 are consolidated forming pultruded fiber reinforced thermoplastic structure 33, which is then cooled to below the melting temperature of matrix resin 15 while passing through passage 85 of cooling die 32.

The fiber volume percent and resin volume percent required in pultruded thermoplastic structure 33 is preselected or predetermined; and resin meter and profile die 30 and cooling die 32 are constructed to achieve the predetermined or selected volume ratios.

Fiber reinforced thermoplastic structure 33 is pulled by a belted pulling mechanism 34 (FIG. 1) through cut-off station 36, or pulled by a pulling and winding device, as will be explained hereinafter in reference to the embodiment of the invention shown in FIG. 5.

Figure 4:
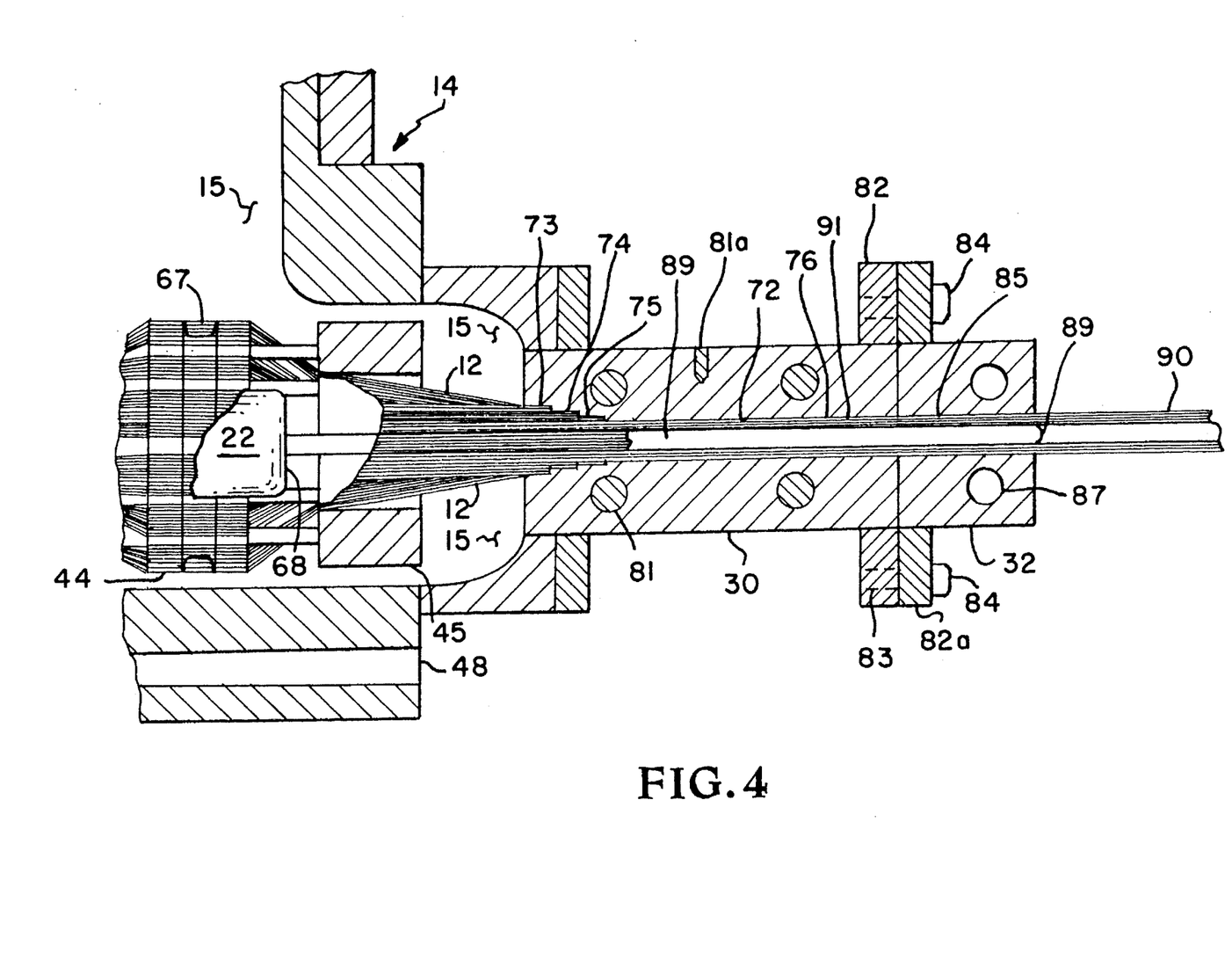
FIG. 4 is a part sectional, part schematic, part cut away, side view of the pultrusion machine of FIG. 1 and illustrating the die therefor employed when pultruding pipe or tubes.

Referring now more particularly to FIG. 4, details of a system according to the present invention for obtaining pultruded fiber reinforced thermoplastic pipe or tube, either round, square, rectangular of other open center profiles is illustrated. For pultruding round pipe or tubes, an elongated sting or mandrel 89 is secured to and extends from flow control insert 22. Sting 89 is fabricated from round rod or bar stock having an outside diameter or dimension equal to the inside diameter of the fiber reinforced thermoplastic tube 90 to be pultruded. Sting 89 is extended horizontally through the center of resin meter and profile die 30 and cooling die 32. Sting 89 is attached to flat end 68 of resin flow control insert 22 and extends through passageway 72 of resin meter and profile die 30 and passageway 85 of cooling die 32. A space 91 is maintained between sting 89 and the inside wall of profile forming section 76 of resin meter and profile die 30.

In operation, multiple tows 12 are distributed around sting 89 and pulled through impregnation vessel 14 for impregnation with resin 15, as previously described. Excess impregnating resin 15 is metered out of fiber tows 12 as the resin impregnated tows pass through cross-section areas 73, 74, 75 and 76, leaving only the volume of resin 15 required to achieve the desired final fiber tows 12 volume to resin 15 volume ratio in the fiber reinforced thermoplastic tube 90. Fiber reinforced thermoplastic tube 90 is pulled by pulling mechanism 34 (FIG. 1) to cut-off station 36, and cut to the desired lengths 36a.

In the preferred embodiment, resin meter and profile die 30 and sting 89 are fabricated from 17-4 PH stainless steel, and heat treated to Rockwell C-45 hardness, and cooling die 32 fabricated from 6061-T6 aluminum alloy. Through passageways 72 and 85 of resin meter and profile die 30 and cooling die 32, respectively, and entrance ends and exit ends of resin meter and profile die 30 and cooling die 32 are polished to a surface finish of four micro-inches RMS.

Figure 5:
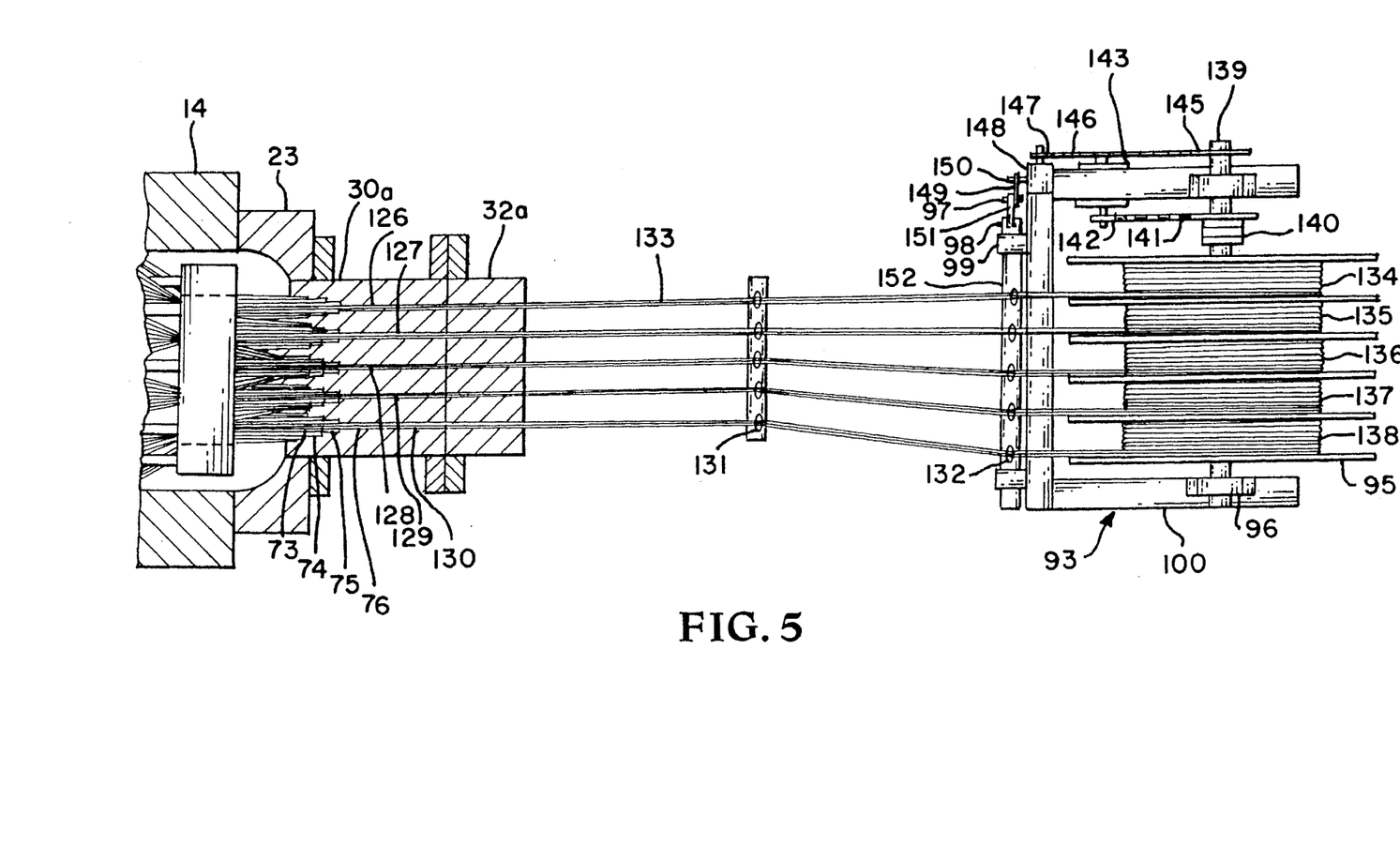
FIG. 5 is a part sectional, part cut away, top view of the pultrusion machine of FIG. 1 showing details of a multiple cavity, or manifold die modification, with a winding spool structure for take-up and separate compartment storage of the multiple pultruded structures obtained with this embodiment.

Referring now more particularly to FIG. 5, an additional modification of the present invention employs a pulling and winding spool, generally designated by reference numeral 93, to exert the pulling force needed in pultrusion system 10 and to serve as storage device for separate continuous fiber reinforced structures produced according to the present invention. The specific embodiment described herein is related to pultruding and winding simultaneously, several thousand feet of continuous fiber reinforced thermoplastic structures 133, employing combined resin meter and profile die 30a and cooling die 32a which are provided with five separate through passageways for pultruding five separate continuous fiber reinforced structures 133, simultaneously, and winding the five structures 133 in separate compartments on spool body 95 of pulling and winding spool 93.

The fiber structures 133 in this specific embodiment were round rods, each having a diameter of 0.113 inch. The fiber reinforcement (fiber tows 12) was fiberglass roving, 113 yards per pound yield, electrical grade (E-glass). Two separate batches of resin 15 were used, with one batch consisting of polyethylene terephtahlate (PET), which was reclaimed from two and three liter soft drink bottles. The bottles were mixed, some clear, some green in color, and originally used to bottle Coca Cola, Pepsi Cola, 7-Up, Sprite, Mountain Dew, root beer, etc. The recycled bottles were chopped into chips, chunks, and shreds for feeding into feed tube 19 (FIG. 1). A second batch of resin 15, consisted of virgin or unused bottle grade PET, and supplied in pellets by a commercial supplier. Both the recycled PET bottles and the unused PET performed excellent and produced structural quality fiber reinforced rods.

In operation, the ends of ten rovings (fiber tows 12 FIG. 1) are threaded through fiber tow guide and heating vessel 13 and an empty impregnation vessel 14. Combined resin meter and profile die 30a with cooling die 32a attached to resin meter and profile die 30a, is attached to exit end 23 of impregnation vessel 14. Combined resin meter and profile die 30a and cooling die 32a are provided with a plurality of five separated through passageways, designated by reference numerals 126, 127, 128, 129 and 130. Two roving ends (fibers tows 12) are threaded through each of the five passageways, 126, 127, 128, 129 and 130 which are machined to pre-calculated dimensions to achieve a fiber volume of fifty-five percent and a resin volume of forty-five percent in structures 133, as will be further explained hereinafter. The ends of the rovings exiting from passageways 126, 127, 128, 129 and 130 respectively, are threaded through guides 131 and 132 and attached to pulling and winding spool mechanism 93, in respective compartments 134,135,136, 137 and 138, as will also be further explained hereinafter.

In starting the operation, impregnation vessel heaters 48, inserted in cavities 48a in vessel 14, combined resin meter and profile die heaters 81, resin melting vessel heater 61, and chilled water circulation in cooling die 32a, are all activated. Unmelted thermoplastic resin 15 is transferred to feed tube 19 and, when operating temperature is reached, the melted thermoplastic resin 15 in melting vessel 16 flows into impregnation vessel 14 and is continuously replenished through feed tube 19. Pulling and winding spool mechanism 93 is activated to commence pulling and winding. The unimpregnated fiber tows 12, extending from the exit end of cooling die 32a, serve as leaders at the beginning of the operation to pull fiber tows 12 from spools 11 through fiber tow guide and heating vessel 13, through impregnation vessel 14 (which is filled with melted resin 15) and fiber tows 12 are impregnated with melted resin 15. While passing through resin meter and profile die 30a, excess resin 15 is forced or squeezed out of tows 12 in four steps, and only a pre-calculated volume of resin 15 is allowed to pass through passageways 126,127, 128, 129 and 130 with fiber tows 12. This is accomplished by providing sequentially reduced size cross-sectional areas 73, 74, 75 and 76 in each of the individual passageways, as described hereinbefore in reference to FIGS. 1–4. Thus, the ratio of resin volume to fiber volume allowed to pass through resin meter area 73 is seventy-eight volume percent resin 15 and twenty-two volume percent fiber tows 12. The ratio of resin to fiber allowed to pass through resin meter 74 is seventy volume percent resin 15 to thirty volume percent fiber tows 12; and, while passing through resin meter area 75, the resin to fiber ratio is reduced to sixty-four volume percent resin to thirty-six volume percent fiber tows 12. When passing into and through area 76, the final excess resin 15 is metered out of fiber tows 12, resulting in a resin to fiber ratio of forty-five volume percent resin to fifty-five volume percent fiber tows 12, which is the ratios for which resin meter and profile die 30a is designed to achieve. While passing through area 76 of passageways 126, 127, 128, 129 and 130, fiber tows 12 and resin 15 are consolidated to form fiber reinforced thermoplastic structures 133, and in passing through cooling die 31, the temperature of structures 133 is lowered to below the melting point of resin 15, causing the resin to solidify.

Structures 133, exiting from cooling die 32a are pulled through separated stationary guides 131. Stationary guides 131 are fixed to the frame of pulling and winding spool mechanism 93 to provide for alignment and leveling of structures 133 with resin meter and profile die 30a and cooling die 32a, and for transition through winding guides 132, which are mounted on winding arm 152. Winding arm 152 is fixedly attached to pulling and winding spool 93, as will be further explained hereinafter.

Structures 133 are pulled through winding guides 132 and wound in separated compartments 134, 135, 136, 137 and 138, respectively, on spool body 95 which is attached to pulling and winding spool 93.

Pulling and winding spool 93 is a mechanized device or machine, designed for pulling and winding small diameter rods or thin flat rectangular bars on a spool body and is provided with winding guide 132; detachable winding spool body 95 with compartments 134, 135, 136, 137 and 138; drive shaft 139; drive clutch 140; sprockets 141, 142, 145, and 147; drive chains 144 and 146; drive motor 143; speed reducer 148; a drive arm 149; drive link 151; connecting pins 97 and 98; winding arm 152; winding arm bearings 99; drive shaft bearings 96; and frame 100.

In operation, drive motor 143 supplies power to drive sprocket 142. Drive sprocket 142 drives sprocket 141 through drive chain 144, clutch 140 attached to drive shaft 139 mounted to frame 100 by bearings 96, engages sprocket 141, which causes drive shaft 139 to rotate. Spool body 95 is attached to drive shaft 139 and rotates when clutch 140 is engaged with sprocket 141, and sprocket 141 is rotating. Spool body 95 is provided with separated compartments 134, 135, 136, 137 and 138, in which structures 133 are wound. Sprocket 145 is attached to drive shaft 139 and caused to rotate when clutch 140 is engaged, and drive shaft 139 and spool body 95 are rotating. Sprocket 145 drives sprocket 147 through drive chain 146.

Sprocket 147 is connected to right angle speed reducer 148, which is mounted to frame 100 and, when rotating, causes drive shaft 150 of speed reducer 148 to rotate. One end of drive arm 149 is attached to drive shaft 150, a second end of drive arm 149 is attached to one end of drive link 151 by pin 97. A second end of driver link 151 is attached to winding arm 152 by pin 98. Winding arm 152 is mounted to frame 100 by linear bearings 99. When drive shaft 150 rotates, drive arm 149 is caused to rotate and moves winding arm 152 horizontally either to the left or to the right depending on the location of drive arm 149.

Speed reducer 148 is designed to rotate drive arm 149 in a counter clockwise direction, and when moving through the 9:00 O'clock position, winding arm 152 position is at the maximum left location, as viewed from cooling die 32a. When drive arm 149 moves past the 9:00 O'clock position (toward 6:00 O'clock position), winding arm 152 reverses direction and begins to move to the right, and when passing through the 3:00 O'clock position, winding arm 152 reverses direction again and starts to move to the left. Thus, structures 133 are wound in layers, as winding arm 152 moves left and right, reversing directions each time drive arm 149 rotates 180 degrees. Speed reducer 148 causes drive arm 149, through drive link 151, to move winding arm 152 a distance equal to the diameter or width of structures 33 with each revolution of spool body 95. Structures 133, constrained by winding guides 132, are gradually moved a distance equal to their respective diameters or widths with each revolution of spool body 95 as the spool winds structures 133 into separated individual compartments 134, 135, 136, 137 and 138.

Although the invention has been described relative to specific embodiments thereof it is not so limited and the specific examples given herein are to be deemed exemplary and are not to be considered as exhaustive. Also, the specific embodiments described herein have been directed to specific recycled and virgin thermoplastic resins but it is to be understood that the impregnating material 15 may also be a selected thermosetting polymer or resin if so desired. Also, in the description herein, the terms "resin" and "polymer" are to be considered as generic and synonymous and intended to include any thermoplastic or thermosetting impregnating material.

Structures 33 and 33a may be employed to mold or fabricate additional larger structural components of any desired configuration. There are many modifications and variations of the present invention that will be readily apparent to those skilled in the art in the light of the above teachings. It is therefore to be understood that within the scope of the appended claims, the invention may be practiced other than as specifically described herein.

What is claimed as new and desired to be secured by Letters Patent of the United States is:

1. A pultrusion system for making continuous length reinforced thermoplastic structures comprising:
   a resin impregnation vessel for housing a quantity of an impregnation resin;
   means providing a continuous supply of an impregnation resin to said resin impregnation vessel;
   multiple spools of fiber tow disposed adjacent said impregnation vessel;
   a fiber guide and heating vessel positioned between said multiple spools of fiber tow and said impregnation vessel;
   an end plate in said fiber guide and heating vessel and provided with a series of openings therethrough arranged in a circular pattern;
   said fiber guide and heating vessel being attached to said impregnation vessel and serving to guide, and maintain separate through said end plate, individual fiber tows leading from said multiple spools and guiding said tows into said impregnation vessel;
   means providing radiation heat to said fiber guide and heating vessel to preheat the fiber tows passing therethrough into said impregnation vessel;
   said impregnation vessel having a fiber entrance end and a fiber exit end;
   means provided in said fiber entrance end of said impregnation vessel serving to maintain the individual fiber tows separate and in a circular pattern leading into said impregnation vessel;
   a fiber control insert disposed within said impregnation vessel;
   said fiber control insert including a series of spaced cylindrical rings to alternately spread and compact the fiber tows to ensure maximum exposure to the impregnation resin in the impregnation vessel;
   means suspending said fiber control insert horizontally within said impregnation vessel;
   a resin flow control device suspended horizontally through the center of said fiber control insert;
   said resin flow control device serving to direct the resin flow toward the fiber tows and exit end of said impregnation vessel;
   a combined resin meter and profile die attached to said exit end of said impregnation vessel for receiving the impregnated fiber tows therethrough;
   said combined resin meter and profile die controlling the amount of impregnation resin contained within the exiting fiber tows and shaping the final profile of the pultruded structure;
   a cooling die attached to said combined resin meter and profile die and serving to lower the temperature of the exiting impregnated fiber tows from said combined resin meter and profile die to a temperature below the melting point of the impregnation resin; and
   a pulling mechanism for pulling the impregnated fiber tows from said cooling die.

2. The pultrusion system of claim 1 wherein said means providing a continuous supply of an impregnation resin includes:
   a resin feed tube having a first end for receiving a supply of solid resin material, a second end in fluid communication with said resin impregnation vessel, an intermediate portion disposed between said first and said second ends, and
   heater means disposed adjacent said intermediate portion for melting the solid resin material before it is received by said resin impregnation vessel.

3. The pultrusion system of claim 2 including a filter screen disposed in said resin feed tube between said intermediate portion and said second end of said resin feed tube in fluid communication with said resin impregnation vessel, whereby said heater means converts said solid resin into a molten resin mass and said filter screen serves to prevent any solid resin from entering said resin impregnation vessel.

4. The pultrusion system of claim 3 wherein said heater means comprises a band heater encircling said intermediate portion of said resin feeder tube.

5. The pultrusion system of claim 3 wherein said resin impregnation vessel is provided with an entrance end plate structure having a first side extending inside said fiber guide and heating vessel and a second side having a concave opening therein and wherein heat from said molten resin mass received by said resin impregnation vessel in combination with heat supplied to said resin impregnation vessel serves to provide radiation heat to said fiber guide and heating vessel through said end plate structure.

6. The pultrusion system of claim 5 wherein said spaced cylindrical rings are interconnected and wherein said means suspending said fiber control insert horizontally within said impregnation vessel includes a plurality of spaced bolts extending through said entrance end plate structure and received by at least one of said series of spaced cylindrical rings.

7. The pultrusion system of claim 1 including a plurality of spaced bolts connecting at least one of said series of spaced cylindrical rings to said resin flow control device to maintain said resin flow control device suspended horizontally through the center of said fiber control insert.

8. The pultrusion system of claim 7 wherein said plurality of spaced bolts connecting at least one of said series of spaced cylindrical rings to said resin flow control device includes five equally spaced bolts extending transversely through said at least one of said series of spaced cylindrical rings and threadingly received in the exterior surface of said resin flow control device.

9. The pultrusion system of claim 1 wherein said resin impregnation vessel is provided with an entrance end plate structure having a concave opening therein and said resin flow control device is provided with a first end having a hemispherical end surface profile disposed adjacent said concave opening in said entrance end plate structure.

10. The pultrusion system of claim 9 wherein said resin flow control device is provided with a second flat end facing and spaced from said exit end of said impregnation vessel.

11. The pultrusion system of claim 1 wherein said combined resin meter and profile die attached to said exit end of said impregnation vessel for receiving the impregnated fiber tows therethrough includes a stepped passageway therethrough, said stepped passageway reducing in cross-sectional area from an enlarged entrance way to a reduced cross-sectional area desired for the final structure, said stepped passageway serving to compact the impregnated fibers received therethrough and to effect squeezing out of excess resin, and means for heating said impregnated fibers while in said combined resin meter and profile die.

12. The pultrusion system of claim 11 including a cooling die attached to said resin meter and profile die, a passageway extending through said cooling die and aligned with said passageway in said resin meter and profile die for receiving the heated resin impregnated fibers therethrough, and means in said cooling die to effect cooling of the resin impregnated fibers received to a temperature below the melting point of the resin to thereby solidify the resin in the impregnated fibers, and a pulling mechanism for pulling the resin impregnated fibers through said impregnation vessel, said combined resin metering and profile die and said cooling die.

13. The pultrusion system of claim 12 wherein said pulling mechanism comprises a pair of spaced, motor driven belts, said motor driven belts receiving said resin impregnated fibers therebetween and serving to frictionally contact and pull said resin impregnated fibers therethrough to a cut-off station for cutting the impregnated fibers to the desired lengths.

14. The pultrusion system of claim 12 wherein said pulling mechanism comprises a motor driven spool assembly for coiling and storing long lengths of said impregnated fibers, 15. The pultrusion system of claim 1 wherein said resin control device suspended horizontally through the center of said fiber control insert is provided with a first hemispherical end surface profile disposed adjacent said fiber entrance end of said resin impregnation vessel and a second flat end surface facing said fiber exit end of said impregnation vessel; an elongated cylindrical sting mandrel secured to said second flat end surface of said fiber control insert and extending through said exit end of said impregnation vessel and through a fiber passageway provided through said combined resin meter and profile die and through said cooling die; said sting mandrel having an exterior diameter that is maintained spaced from the inside of said passageway in said combined meter and profile die and said cooling die; whereby the resin impregnated fiber exiting at said exit end of said impregnation vessel is directed to the exterior of said sting mandrel and guided thereby through the spacing between said sting mandrel and the passageway in said combined meter and profile die and said cooling die to thereby form a tubular configured impregnated fiber product exiting said cooling die.

16. The pultrusion system of claim 1 wherein said combined resin meter and profile die and said attached cooling die are each provided with multiple parallel passageways therethrough for receiving multiple impregnated fiber tows from said resin impregnation vessel; each of said multiple parallel passageways in said combined resin meter and profile die being provided with a stepped reducing diameter portion to squeeze out and meter the final amount of resin for the impregnated fiber passing therethrough; said pulling mechanism for pulling the impregnated fiber tows from said cooling die comprising a motor driven spool assembly; and a pair of elongated spaced guides disposed between said cooling die and said motor driven spool assembly and serving to maintain said multiple impregnated fiber tows separate from each other for while being pulled by said spool assembly.

17. The pultrusion system of claim 16 wherein said spool assembly includes a rotatable spool body, a plurality of spaced dividers disposed along the length of said spool body and serving to divide said spool body into a plurality of separate compartments; said plurality of separate compartments being equal in number to the multiple passageways in said combined meter and profile die and said cooling die and serving to each receive a fiber reinforced thermoplastic structure.

18. The pultrusion system of claim 16 wherein one member of said pair of elongated spaced guides is fixed, means providing reciprocating movement of the other member of said pair of elongated spaced guides during rotation of said spool body to thereby control and guide the impregnated fiber tows being wound on said spool body into individual layers within the respective plurality of separate compartments thereon.

19. The pultrusion system of claim 1 wherein said series of spaced cylindrical rings of said fiber control insert direct said fiber tows being pulled through said immersion vessel over the exterior surface of at least one of said series of spaced cylindrical rings and within the interior of at least one of said series of spaced cylindrical rings.

20. The pultrusion system of claim 19 wherein said series of spaced cylindrical rings comprises four cylindrical rings, said four cylindrical rings having a first and third member thereof provided with an exterior grooved surface to control and maintain resin on the underside of said fiber tows being pulled through said resin impregnation vessel.

21. The pultrusion system of claim 20 wherein the second and fourth member of said four cylindrical rings receive the fiber tows being pulled through said resin impregnation vessel within the interior thereof.

22. A process of making thermoplastic impregnated fibers comprising:

provididing a thermoplastic impregnation vessel having an entrance end and an exit end;

filling the impregnation vessel with a supply of a thermoplastic impregnation resin;

providing a supply of fiber tows leading into the entrance end of the impregnation vessel;

impregnating the fiber tows by pulling the supply of fiber tows through the resin in the impregnation vessel;

providing a fiber control insert including a plurality of spaced annular interconnected rings within the impregnation vessel and a resin flow control device suspended through the center of said fiber control insert;

guiding the fiber tows alternately over and under the plurality of spaced annular interconnected rings to alternately spread and compact the fiber tows to ensure maximum exposure to the impregnation resin in the impregnation vessel;

guiding the thermoplastic impregnated fibers through the exit end of the impregnation vessel into a resin meter and profile die to remove excess resin from the fiber tows and compact the resin within the fiber tows into the desired cross-sectional configuration;

heating the resin impregnated fibers while in the resin meter and profile die;

guiding the impregnated fibers from the resin meter and profile die into a cooling die;

reducing the temperature of the impregnated fibers while in the cooling die to a temperature below the melting point of the thermoplastic resin to thereby solidify the resin and permit recover of a length of thermoplastic reinforced fiber structure.

23. The process of claim 22 including the step of cutting the length of thermoplastic reinforced fiber structure into the desired lengths for utilization thereof in constructing additional reinforced structures.

24. The process of claim 22 including the step of providing the resin meter and profile die with a series of at least five passageways therethrough for receiving an equal number of thermoplastic impregnated fiber structures and wherein each passageway is provided with a series of reducing diameter sections to facilitate squeezing out excess resin from the impregnated fibers and for uniformly compacting the impregnated fibers into unitary structures while in the resin meter and profile die.

25. The process of claim 23 wherein the step of pulling the fiber tows is performed by a rotating spool and including the step of providing separate compartments on the rotating spool to receive and maintain separate long lengths of the thermoplastic reinforced fibers received from the cooling die.

* * * * *